United States Patent
Smets et al.

(10) Patent No.: US 7,424,977 B2
(45) Date of Patent: Sep. 16, 2008

(54) METHOD AND SYSTEM FOR CONDUCTING CONTACTLESS PAYMENT CARD TRANSACTIONS

(75) Inventors: Patrick Smets, Nijlen (BE); Eddy Lodewijk Hortensia Van De Velde, Leuven (BE); Duncan Garrett, London (GB)

(73) Assignee: Mastercard International Incorporated, Purchase, NY (US)

( * ) Notice: Subject to any disclaimer, the term of this patent is extended or adjusted under 35 U.S.C. 154(b) by 493 days.

(21) Appl. No.: 11/182,354

(22) Filed: Jul. 15, 2005

(65) Prior Publication Data

US 2006/0027655 A1 Feb. 9, 2006

Related U.S. Application Data

(60) Provisional application No. 60/588,270, filed on Jul. 15, 2004.

(51) Int. Cl.
*G06K 7/00* (2006.01)
(52) U.S. Cl. ............ 235/486; 235/380; 235/492
(58) Field of Classification Search ........... 235/486, 235/492, 451, 441, 380, 382
See application file for complete search history.

(56) References Cited

U.S. PATENT DOCUMENTS

| | | | |
|---|---|---|---|
| 4,066,873 A | 1/1978 | Schatz | 235/487 |
| 4,697,073 A | 9/1987 | Hara | 235/487 |
| 5,225,977 A | 7/1993 | Hooper et al. | 364/401 |
| 5,466,919 A | 11/1995 | Hovakimian | 235/380 |
| 5,511,114 A | 4/1996 | Stimson et al. | 379/114 |
| 5,623,552 A | 4/1997 | Lane | 382/124 |
| 5,748,737 A | 5/1998 | Daggar | 380/24 |
| 5,808,558 A | 9/1998 | Meek et al. | |
| 5,880,452 A | 3/1999 | Plesko | 235/472 |
| 6,028,920 A | 2/2000 | Carson | 379/114 |
| 6,112,981 A | 9/2000 | McCall | 235/380 |

(Continued)

FOREIGN PATENT DOCUMENTS

EP 1460592 8/2004

(Continued)

OTHER PUBLICATIONS

Contactless Material (WG8); SmartCard Secure Operating System at www.jayacard.org; 3 pages; www.14443.org—Contactless Documentation.

*Primary Examiner*—Edwyn Labaze
(74) *Attorney, Agent, or Firm*—Baker Botts LLP; Manu J. Tejwani (57) ABSTRACT

A system and method for enhancing functional interoperability of contactless payment devices that are used for conducting electronic payment transactions between consumers and merchants. The contactless payment devices include RFID-embedded cards issued to consumers and proximity coupling devices such as RFID-enabled readers deployed by merchants. The system and method involve use of a reference card and a reference reader to establish acceptable specifications for issued cards and deployed readers, respectively. The reference card and reference reader are cross-calibrated to link the operational specifications for the cards and the readers. A suitable selection of overlapping specification ranges or tolerances for proper card and reader functions, the enhances the interoperability of the issued cards with a deployed reader, and also the interoperability of deployed readers with an issued card.

18 Claims, 8 Drawing Sheets

U.S. PATENT DOCUMENTS

| | | |
|---|---|---|
| 6,119,940 A | 9/2000 | Klug |
| 6,240,515 B1 | 5/2001 | Carnegie et al. |
| 6,297,789 B2 | 10/2001 | Gauthier et al. |
| 6,315,195 B1 | 11/2001 | Ramachandran ............ 235/380 |
| 6,318,633 B1 | 11/2001 | Drexler ...................... 235/454 |
| 6,369,719 B1 | 4/2002 | Tracy et al. |
| 6,394,346 B1 | 5/2002 | Bonneau, Jr. et al. |
| 6,404,643 B1 | 6/2002 | Chung |
| 6,536,673 B1 * | 3/2003 | Kawasaki et al. .......... 235/492 |
| 6,666,982 B2 | 12/2003 | Breka |
| 2001/0001856 A1 | 5/2001 | Gould et al. .................. 705/39 |
| 2001/0024157 A1 | 9/2001 | Hansmann et al. |
| 2001/0034565 A1 | 10/2001 | Leatherman |
| 2002/0046116 A1 | 4/2002 | Hohle et al. ................... 705/14 |
| 2002/0046117 A1 | 4/2002 | Marion |
| 2002/0199054 A1 | 12/2002 | Akahane et al. |
| 2003/0167207 A1 | 9/2003 | Berardi et al. |
| 2003/0169152 A1 * | 9/2003 | Charrat et al. ............. 340/10.1 |
| 2004/0068472 A1 | 4/2004 | Sahota et al. |
| 2004/0085190 A1 * | 5/2004 | Tuttle et al. ............... 340/10.1 |
| 2005/0222961 A1 * | 10/2005 | Staib et al. .................... 705/64 |

FOREIGN PATENT DOCUMENTS

| | | |
|---|---|---|
| JP | 2001-076117 | 3/2001 |
| WO | WO 92/16913 | 1/1992 |

* cited by examiner

F I G. 1A. ISO/IEC Ref: Equipment and methodology

F I G. 2A. *PayPass* -- Ref: Equipment

FIG. 1B

Reader testing

1. Calibrate PayPass Reference PICC for measuring
   - power transmission
   - data transmission PCD ⟶ PICC using PayPass Ref. PCD (1) Power emission reader
(2) Quality transmitter reader 2. Put reader under test in place.
Analyze reader power parameters by means of PayPass Reference PICC:
- Reader power parameters (1)
- Reader transmitter parameters (2)

3. Calibrate PayPass Reference PICC for
 • data transmission PICC ⟶ PCD
using PayPass Ref. PCD (3) Receiver quality reader 4. Put reader under test in place.

If response of PayPass Ref. PICC is followed by reader command:

- Reader receiver parameters OK (3)

Card testing

1. Calibrate PayPass Reference PCD for
   - power transmission
   - data transmission PCD ⟶ PICC
   using PayPass Ref. PICC (4) Power requirements card
(5) Quality receiver card 2. Put card under test in place.

If card responds to reader command:

- Card power requirements OK (4)
- Card receiver requirements OK (5)

3. Calibrate PayPass Reference PCD for
   • data transmission PICC ⟶ PCD
   using PayPass Ref. PICC 4. Run on real card and analyze response.

If card response OK:

- Card transmitter requirements OK (6)

FIG. 2B4

F I G. 3. *PayPass* - Ref. PICC behavior measured on *PayPass* - Ref. PCD

F I G. 4. PICC *C* behavior relative to *PayPass* - Ref. PICC behavior of Figure 3

F I G. 5. *PayPass* - Ref. PICC behavior measured on *PayPass* - Ref. PCD, relative to behavior Figure 3

F I G. 6. PICC C behavior vs. PCD R

F I G. 7. ISO/IEC Ref: Equipment

METHOD AND SYSTEM FOR CONDUCTING CONTACTLESS PAYMENT CARD TRANSACTIONS

CROSS-REFERENCE TO RELATED APPLICATIONS

This application claims the benefit of U.S. provisional patent application No. 60/588,270 filed on Jul. 15, 2004. This application is also related to U.S. patent application Ser. No. 11/182,355, and Ser. No. 11/182,356, Ser. No. 11/182,357, and Ser. No. 11/182,358, co-filed on even date, all of which claim the benefit of the aforementioned patent application No. 60/588,270. All of the aforementioned patent applications are hereby incorporated by reference herein in their entireties

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. RFID technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RFID-enabled payment terminal. The contactless payment cards can provide consumers with simple, fast and convenient ways to pay for goods and services, for example, in retail establishments, stores or supermarkets.

Several RFID technologies are available for use in contactless payment cards and card readers/terminals. The basic components of a contactless system are the contactless reader (or Proximity Coupling Device (PCD)) and a transponder. The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other. The transponders may be the contactless payment cards.

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The ISO/IEC 14443 proximity card standards (ISO 14443) have been used for several contactless card deployments worldwide. The targeted range of operations for ISO 14443 proximity cards is up to 10 cms, although this range varies depending on power requirements, memory size, CPU, and co-processor.

The ISO 14443 standards document has four distinct parts:

Part 1: Physical Characteristics, defines the physical dimensions for a Proximity Integrated Circuit Card (PICC). The card is the ID-1 size (85.6 mm×54.0 mm×0.76 mm). This is the same size as a bank credit card.

Part 2: Radio Frequency Power and Signal Interface, defines key technical characteristics of the contactless IC chips, including items such as frequency, data rate, modulation, and bit coding procedures. Two variations are detailed in Part 2, the Type A interface and the Type B interface. Both operate at the same frequency and use the same data rate, but they differ from one another in the areas of modulation and bit coding.

Part 3: Initialization and Anticollision. Initialization describes the requirements for proximity coupling device (PCD) (i.e., the reader) and the card to establish communication when the card is brought into the reader's radio frequency (RF) field. Anticollision defines what happens when multiple cards enter the magnetic field at the same time, identifying how the system determines which card to use in the transaction and ensuring that all cards presented are inventoried and processed.

Part 4: Transmission Protocols, defines the data format and data elements that enable communication during a transaction.

For a system of contactless payment cards and card readers to be compliant with ISO 14443, they must meet the requirements of at least some of parts of the voluntary standard. In addition to contactless technologies that are standardized under ISO 14443, a number of proprietary contactless interfaces are also used in the industry (e.g., Cubic's GO-Card and Sony's FeliCa card). With existing card technology deployments, interoperability can be an issue. Card readers deployed by vendors in the marketplace should preferably accommodate several different card types. For example, a desirable card reader would support ISO 14443 Type A and Type B cards, ISO 15693 cards and any additional proprietary card types.

Figure 1A:
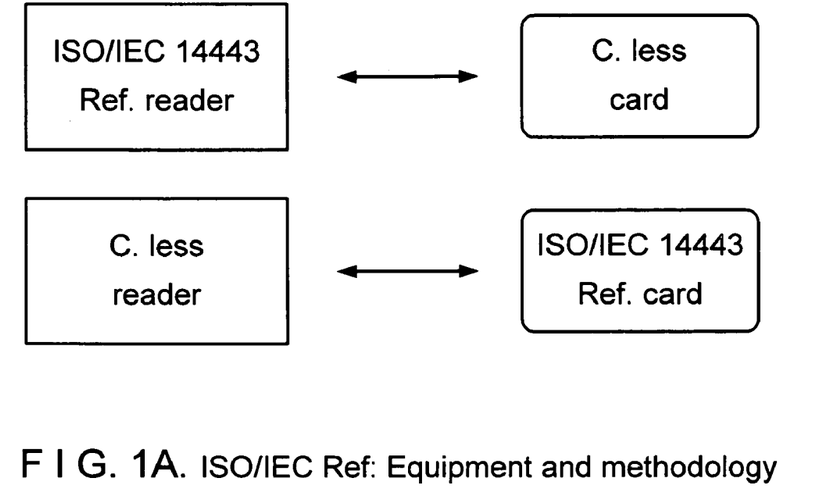
FIG. 1a is a block diagram which schematically illustrates the use of a Reference PICC for testing the properties of a product contactless payment card reader and the use of a Reference PCD for testing the properties of a product contactless payment card, as prescribed by the ISO 10373-6 Standard.

Interoperability issues can arise even with card deployments that are presumably compliant with a single ISO standard (e.g., ISO 14443). In the ISO 14443 standard, all requirements or specifications related to RF Power and signal interfaces in the contactless card and reader system (i.e. the physical layer in an Open System Interconnection (OSI) model view of the system) are defined using separate standardized tests for cards and for readers. The ISO/IEC 10373 Standard Part 6 (ISO 10373-6) deals with test methods, which are specific to contactless integrated circuit card technology (proximity card). Compliance of contactless cards and readers to ISO 14443 is verified using reference devices. According to ISO 10373-6, a set of "reference" cards (i.e., Reference PICC), which represent the characteristics of contactless cards, is used for measuring specification compliance of a contactless reader. (See e.g., FIG. 1a). For example, the Reference PICC is used to test the magnetic field produced or transmitted by a PCD, and to test the ability of the PCD to power a PICC. Similarly, a "reference" reader (i.e., a Test or Reference PCD), which may represent the characteristics of a typical contactless reader, is used for measuring specification compliance of contactless cards. For example, the Reference PCD is used to test the load modulation that is generated by cards during testing.

Figure 1B:
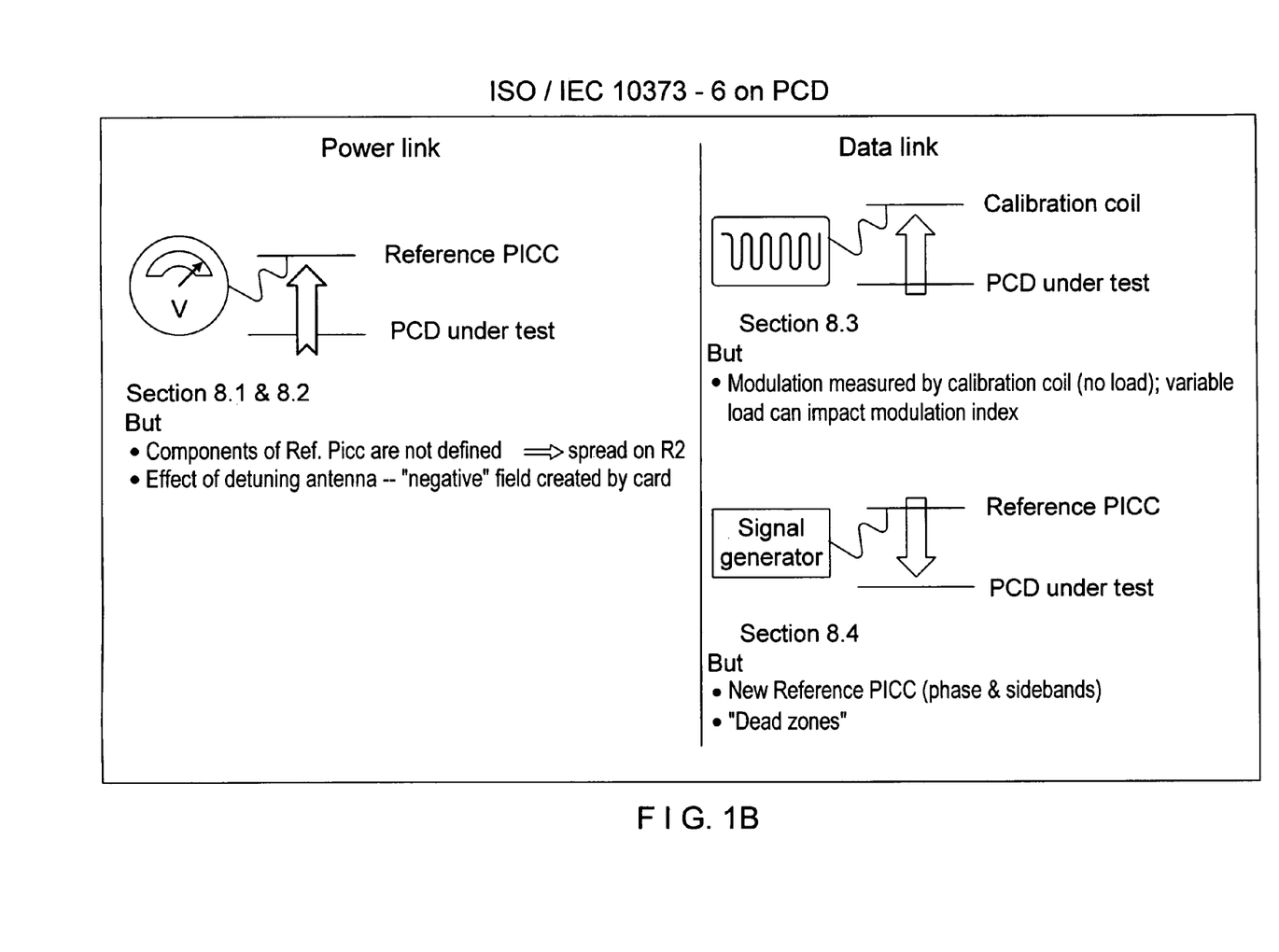
FIG. 1b is a schematic illustration of a set of functional tests conducted on a product reader under conventional procedures for testing power and data links between cards and readers according to ISO 10373-6.

FIG. 1b shows the functional tests conducted on a product reader under ISO 10373-6 for testing the power and data links between cards and readers.

While the separate card and reader compliance test procedures under ISO 10373-6 may ensure that deployed product devices individually have characteristics that fall in either the designated specification range for cards or readers, the procedures do not ensure interoperability in the field. Cards and/or readers verified as compliant may be only marginally so (e.g., by having a characteristic value at the end or edge of a designated specification range). This manner of standards compliance can lead to operational failure in the field. For example, a marginally compliant card may be unreadable or difficult to read using a card reader that is also only marginally compliant.

Consideration is now being given to ways of enhancing interoperability of electronic payment devices that are used in contactless electronic payment systems. Attention is directed to reducing variations in card and reader properties consistent with commonly accepted Standards. In particular, attention is directed to improving specification compliance procedures to enhance interoperability.

SUMMARY OF THE INVENTION

In accordance with the present invention, methods and systems are provided for enhancing interoperability of electronic payment devices that are used in contactless electronic payment systems. The electronic payment devices include RFID-embedded cards issued to consumers and proximity coupling devices such as RFID-enabled readers deployed by merchants. The methods and systems involve use of a reference card and a reference reader to establish acceptable specifications for issued cards and deployed readers, respectively. The reference card and reference reader are cross-calibrated to link the operational specifications for the cards and the readers. A suitable selection of overlapping specification ranges or tolerances for proper card and reader functions, then enhances the interoperability of the issued cards with a deployed reader, and also the interoperability of deployed readers with an issued card.

Further features of the invention, its nature and various advantages will be more apparent from the accompanying drawings and the following detailed description.

DETAILED DESCRIPTION OF THE INVENTION

The present invention is described in the context of implementations of electronic payment systems in which the contactless payment device specifications are intended to conform to a common industry standard such as the ISO 14443 Standard, which further specifies standardized test methods (i.e., ISO 10373-6 Test Methods, Proximity Cards) for verification of the specification of individual contactless payment devices. Recently, assignee MasterCard International Incorporated ("MasterCard") has developed proprietary specifications MasterCard PayPass™ ISO/IEC 14443 Implementation Specification ("PayPass") for implementation of proximity payment card technologies. The PayPass implementation is consistent with the ISO 14443 Standard and provides a convenient example illustrating the principles of the present invention. It will be understood that the selection of the PayPass implementation for purposes of illustration is only exemplary, and that the principles of the present invention can be more generally applied to electronic payment devices and systems that operate under other common industry or proprietary standards.

Figure 2A:
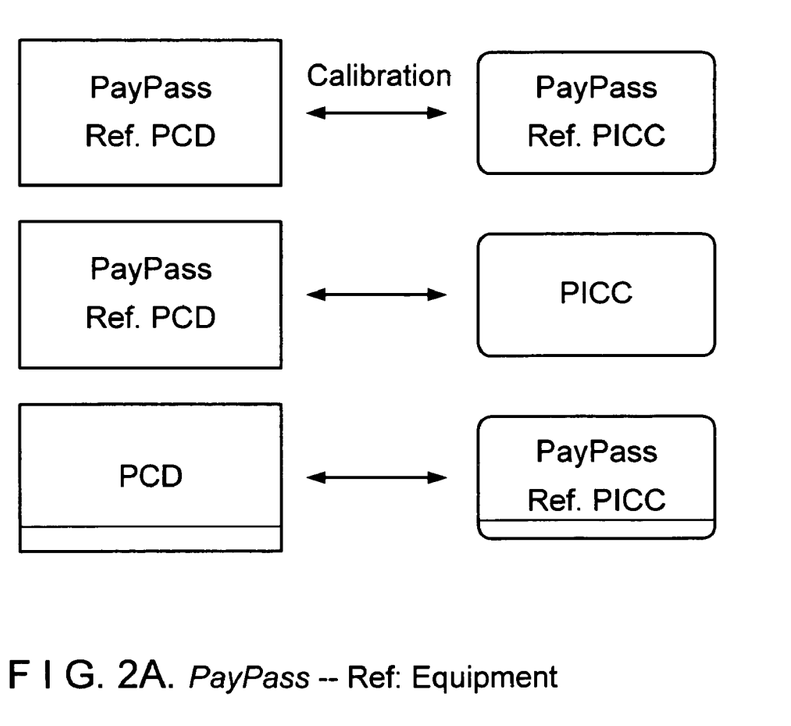
FIG. 2a is a block diagram, which schematically illustrates the step of cross calibrating of a Reference PICC with a Reference PCD in accordance with the principles of the present invention. The cross-calibrated Reference PICC and PCD devices are then used for testing the functional properties and specifications of a product contactless payment card and reader, respectively.
Figure 2B:
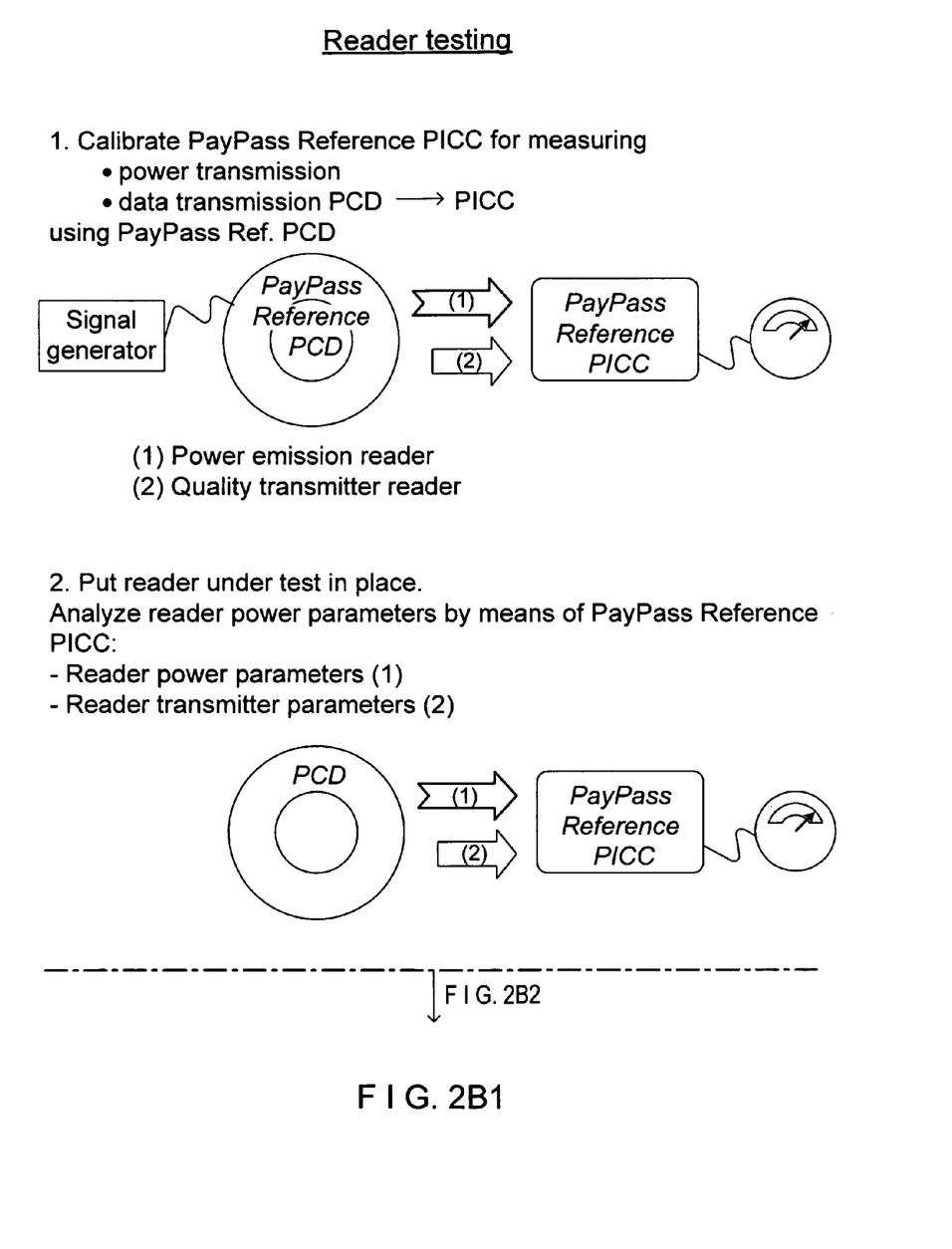
FIG. 2b is a schematic illustration of the functional tests conducted on a product reader for testing the power and data links between contactless proximity cards and readers in accordance with the principles of the present invention.
Figure 2B:
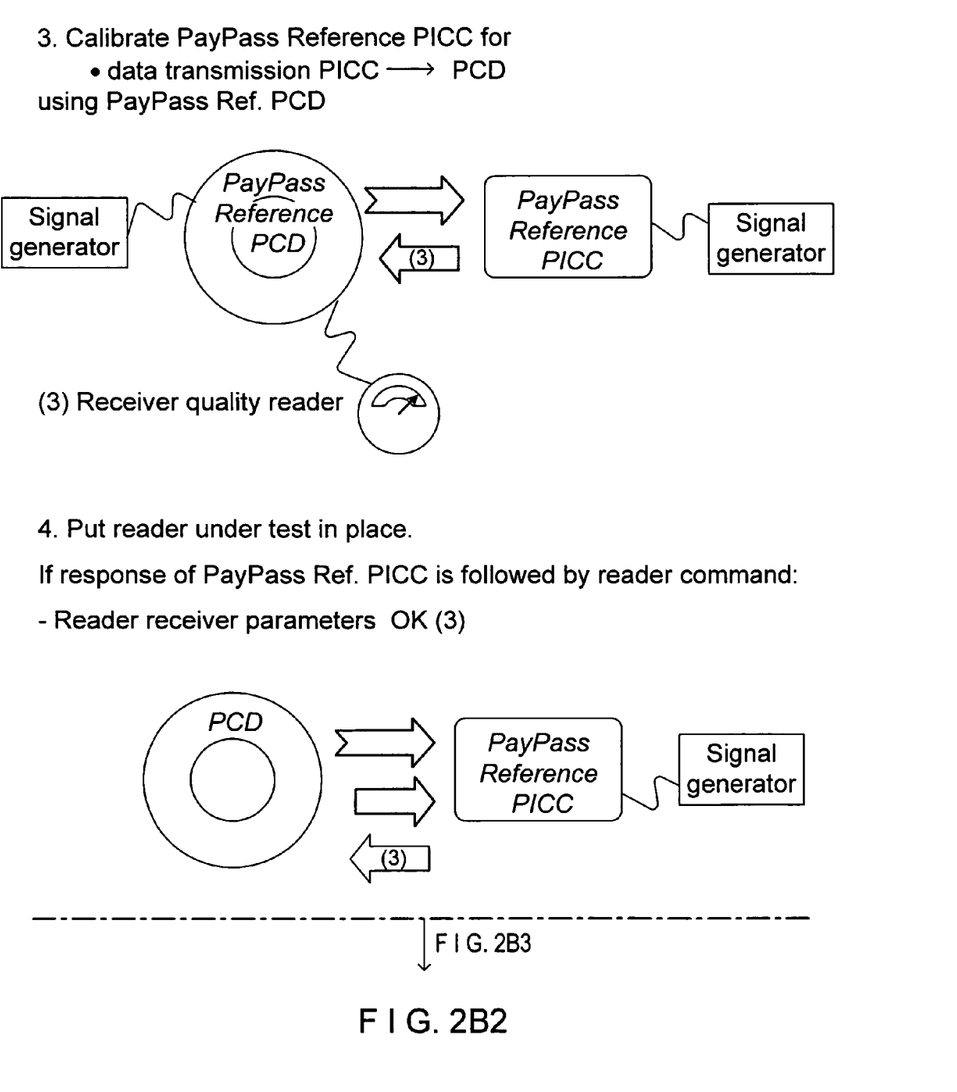
Figure 2B:
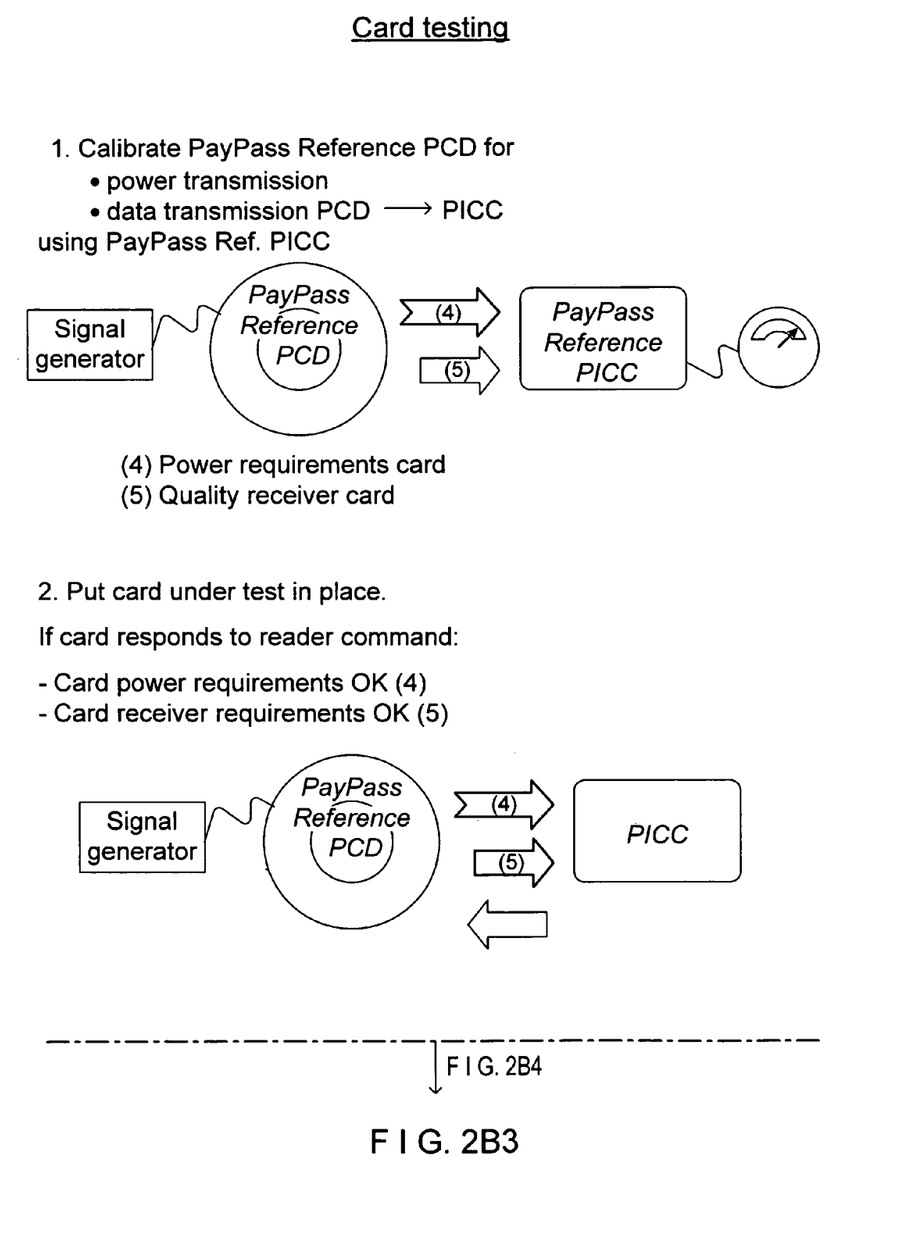
Figure 2B:
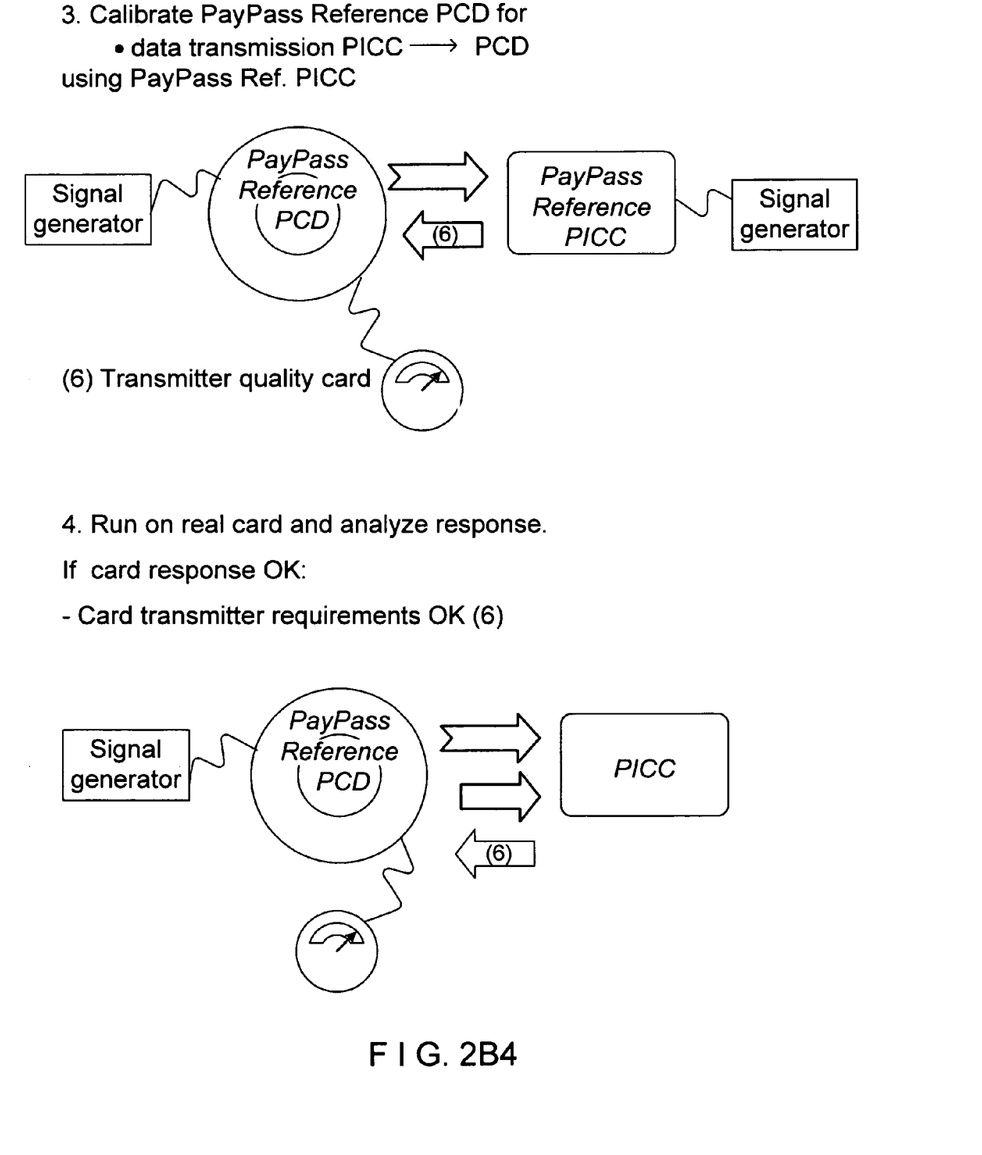

The present invention provides a method and a system for enhancing the interoperability of contactless payment devices (i.e., product cards issued to consumers and product readers deployed by merchants), which may be used to conduct electronic payment transactions in the field. The system and method ensure that individual product cards and readers operate or function in tighter specification ranges than they are permitted to operate under the ISO 14443 standard. The system and method involve cross-calibrating the reference devices (i.e., the Reference PICC and Reference PCD devices) which are used to test specification compliance of individual product readers and cards under the ISO 14443 and ISO 10373-6 standards. (See FIG. 2a). The Reference PCD is used to establish a range of observed functional behaviors or parameters ("nominal card range") of the Reference PICC. Product card readers are required to have functional behaviors or parameters that are within this nominal card range as measured by the Reference PCD. Conversely, a Reference PICC is used to establish a range of observed functional behaviors or parameters ("nominal reader range") of Reference PCDs. Product readers are required to have functional behaviors or parameters that are within the nominal reader range when reading the reference card.

FIG. 2b schematically shows the functional tests conducted under the PayPass implementations according to the present invention.

The cross-calibration of the Reference PICC and Reference PCD establishes a relation between the two standard devices, and links the specifications for individual product cards with the specifications for product readers. This avoids interoperability failures that may arise under conventional unconnected or separate testing of card and reader specifications, for example, when the cards and readers lie at the extreme edges of their respective specification ranges that are allowed under the ISO 14443 standard.

The system and method (which are both collectively referred to as the "PayPass implementation" herein) are based on a mathematical algorithm which ensures interoperability of product payment devices upon the suitable selection or specification of device parameters.

Figure 3:
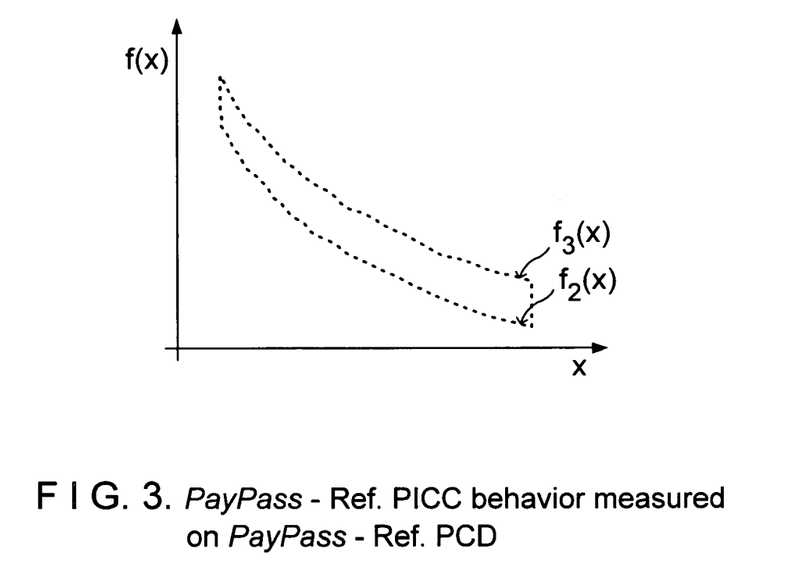
FIG. 3 is a graph illustrating a range of behaviors of diverse cards simulated by a reference card and as measured or observed by a reference reader, in accordance with the principles of the present invention.

To ensure proper functioning of a product reader (e.g., PCD R) with a product card (e.g., PICC C), a PayPass—Reference PICC is used to generate a range of behaviors [f2(x), f3(x)] in a function f of variable x. The function f may, for example, be a magnetic field response as a function of distance. This range of behaviors [f2(x), f3(x)] is observed on a PayPass—Reference PCD. See FIG. 3.

Figure 4:
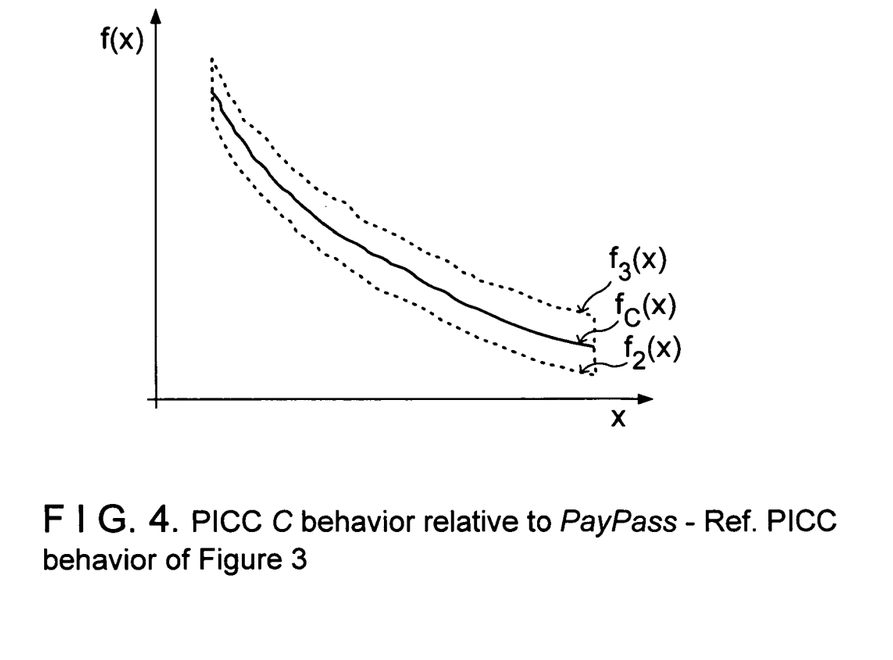
FIG. 4 is a graph illustrating the behavior of a complaint card whose behavior lies in the range of behaviors observed in FIG. 3 in accordance with the principles of the present invention.

The PayPass implementation may require or specify that a product card (i.e. PICC C) must display a behavior fc(x) that falls within the range of established card behaviors [f2(x), f3(x)] to be "compliant". The behavior fc(x) is observed on the PayPass—Reference PCD. See FIG. 4.

Figure 5:
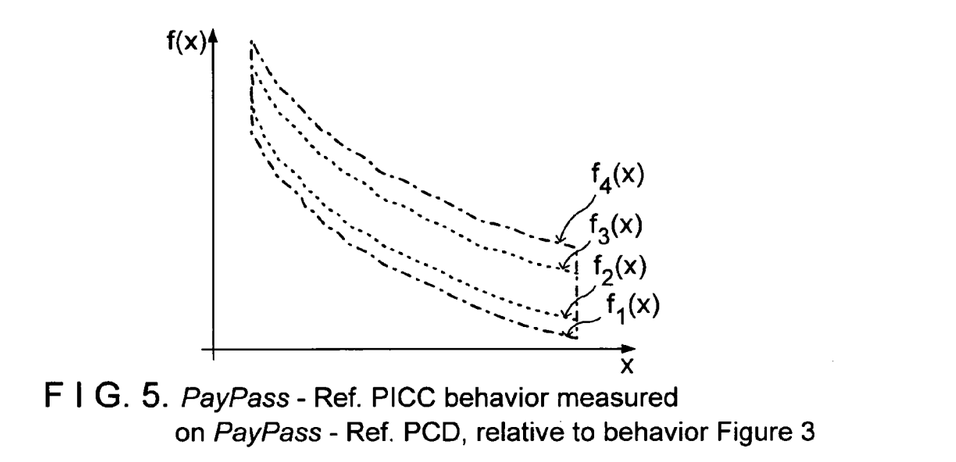
FIG. 5 is a graph illustrating the behavior of a reference card as measured on a reference reader, relative to the behaviors shown in FIG. 3, in accordance with the principles of the present invention.
Figure 6:
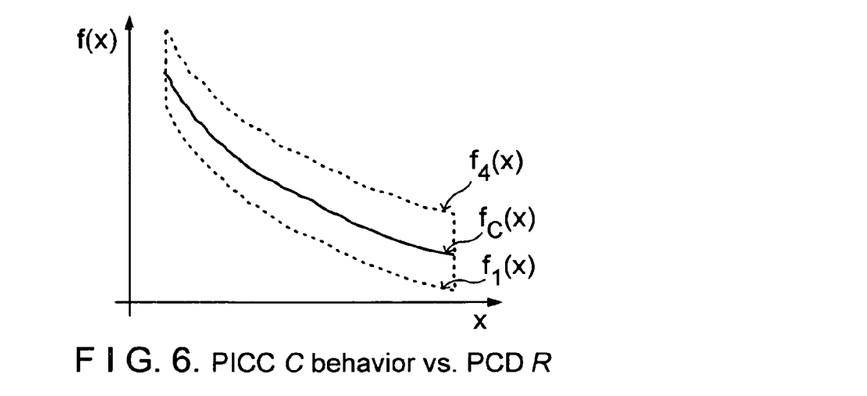
FIG. 6 is a graph illustrating the behavior of a compliant card of FIG. 4 as measured on a calibrated reference reader, in accordance with the principles of the present invention.

Further, the PayPass implementation may require or specify that a product reader (i.e. PCD R) must function correctly with the PayPass—Reference PICC exhibiting a range of card behaviors [f1(x), f4(x)] as observed on the PayPass—Reference PCD to be "compliant". By requiring or specifying that the range of card behaviors [f1(x), f4(x)] must include the range of card behaviors [f2(x), f3(x)], i.e.

$$[f2(x), f3(x)] \subset [f1(x), f4(x)],$$

the behavior fc(x) of the particular card (PICC C) under consideration is necessarily within the operating range [f1(x), f4(x)] of the reader (PCD R). See FIGS. 5 and 6. Accordingly, the product reader PCD R is expected to operate properly with the product card (PICC C).

Similarly for ensuring proper functioning of a product card (e.g., PICC C) with a product reader (e.g., PCD R), the PayPass—Reference PCD is used to generate a range of reader behaviors [g2(y), g3(y)] for function g of a variable y as observed on the PayPass—Reference PICC. The PayPass implementation may require or specify that a "compliant" reader PCD R should display a behavior gc(y) that falls within the established range [g2(y), g3(y)], where the behavior gc(y) is measured on the PayPass—Reference PICC. Further, the PayPass implementation may require or specify that a product card (i.e. PICC C) must function correctly with the PayPass—Reference PCD exhibiting a range of reader behaviors [g1(x), g4(x)] as observed on the PayPass—Reference PICC. By requiring or specifying that the range of reader behaviors [g1(x), g4(x)] should include the range of reader behaviors [g2(x), g3(x)], which is mathematically represented as:

$$[g2(x), g3(x)] \subset [g1(x), g4(x)],$$

the behavior gc(x) of the particular reader (PCD R) under consideration is necessarily within the operating range [g1(x), g4(x)] of the card (PICC C). Accordingly, the card (PICC C) is expected to operate properly with the reader (PCD R).

As a tangible illustration of the mathematical algorithm described above, it may be useful to consider the example of the power requirements for activating a product PICC card. A PCD reader must provide or transmit a certain amount of power to a PICC to activate the card. Conversely, a product PICC card must work with a certain amount of power received from the PCD reader. In the PayPass implementation, the power PC(d), which is delivered or transmitted by a product PCD reader, is measured as function of distance d on the PayPass—Reference PICC. The value of the power level PC (d) measured on the Pay Pass—Reference PICC is required or specified to fall within a range of power levels $R_{tx,power}$.

Figure 7:
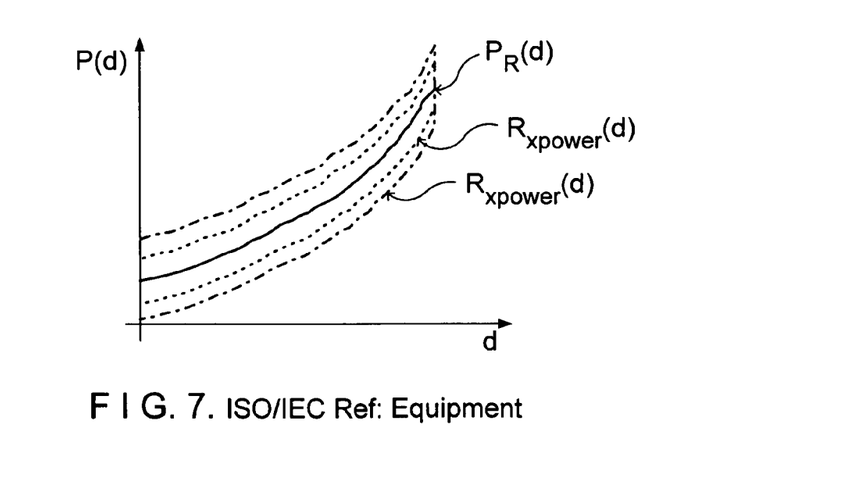
FIG. 7 is a graph illustrating the overlapping specifications derived form cross calibrated reference devices, in accordance with the principles of the present invention.

In the cross-calibration procedure, the PayPass—Reference PCD is configured to generate different power levels which vary over a range $R_{Rx,power}$. The power levels generated by the PayPass—Reference PCD are calibrated with respect to the PayPass—Reference PICC, i.e., the range $R_{Rx,power}$ is a value measured on the PayPass—Reference PICC. In the procedure, the output of a signal generator or power source (e.g. a voltage source) feeding the PayPass—Reference PCD may be increased or decreased until suitable power levels $R_{Rx,power}$ are reached as observed on the PayPass—Reference PICC. The mathematical requirement $$Rtx,power \subset Rrx,power$$

ensures that a product PCD reader will properly power a product PICC card. See FIG. 7.

More generally, the algorithm described above in ¶¶[0026]-[0033] leads to a system and method for ensuring or enhancing power, data transfer, and other functional interoperability of product contactless payment devices. This system and method may, for example, involve:

(a) measuring the power provided by a PCD on a Reference PICC, (b) measuring data transmission (e.g., modulation depth, or other signal parameters) on the Reference PICC, (c) testing data reception (e.g., load modulation sensitivity) by a PCD by generating different signals through the Reference PICC. The PayPass—Reference PICC is first calibrated with respect to the Reference PCD to determine the levels and characteristics of the different signals generated by the Reference PICC, and (d) measuring the data transmission by a PICC on the Reference PCD, with the Reference PCD sending "average" value commands to the PICC and with the Reference PCD providing an "average" power level. Both the power level and the command characteristics produced by the Reference PCD are calibrated with respect to the Reference PICC, (e) checking the data reception and power sensitivity of a PICC using the Reference PCD, with the Reference PCD sending commands with modulation characteristics and power levels at the border of the tolerance interval or range Rrx. Again, for setting these extreme values, the Reference PCD is calibrated with respect to the reference PICC.

The system and method for enhancing interoperability are utilized, for example, in the practice of the PayPass implementation specification. For completeness of description, exemplary portions of the PayPass implementation specification, which describe the electrical characteristics of the contactless interface (i.e. Radio frequency and Signal interface) between a PICC and PCD, are reproduced in Appendix A. The reproduced portions also include step-by-step procedures for cross-calibrating Reference PICC and PCD devices that are used for characterizing the power and data links between payment devices.

It will be understood that the foregoing is only illustrative of the principles of the invention, and that various modifications can be made by those skilled in the art without departing from the scope and spirit of the invention.

We claim:

1. A system of contactless payment devices such as card and reader devices, wherein in operation of the devices, the reader devices transmit signals which are received by counterpart card devices, and the card devices transmit signals which are received by counterpart reader devices, the system comprising:
   a specification range Rtx of a parameter related to a signal transmitted by the device, wherein each device is specified to transmit a signal whose parameter value C is in the range Rtx:
   a specification range Rrx of parameter values of the signal received by the counterpart devices, wherein each counterpart device is specified to operate properly when the received signal parameter has any value in the range Rrx, and wherein the specification range Rtx is a subset of the specification range Rrx so that parameter value C is in the range Rrx and therefore the counterpart device can operate properly in response to the signal transmitted by any device;
   a reference device and a reference counterpart device;
   a specification verification that each counterpart device operates properly when the received signal parameter has any value in the range Rrx by using the reference device to generate and transmit different signals having parameter values across the range Rrx.

2. The system of claim 1 wherein the signals transmitted by the reader devices comprise power and data signals.

3. The system of claim 1 wherein the signals transmitted by the card devices comprise data signals.

4. The system of claim 1 further comprising a specification verification that each device transmits a signal whose parameter value C is within the specification range Rtx as measured using the reference counterpart device.

5. The system of claim 1 wherein each device is a reader and each counterpart device is a card, and wherein the signal transmitted by the reader is a card-activating power signal, and wherein a power level of the signal transmitted by the reader is measured on the reference counterpart device.

6. The system of claim 1 wherein each device is a reader and each counterpart device is a card, and wherein the signal transmitted by the reader comprises a data signal and wherein a characteristic of the signal transmitted by the reader is measured on the reference counterpart device.

7. The system of claim 1 wherein each device is a card and each counterpart device is a reader, and wherein the signal transmitted by the card comprises a load modulated data signal and wherein a modulation characteristic of the signal transmitted by the card is measured on the reference counterpart device.

8. The system of claim 1 wherein the reference device is calibrated with respect to the characteristics of the reference counterpart device and conversely the reference counterpart device is calibrated with respect to the characteristics of the reference counterpart device.

9. In an electronic payment system based on payment devices such as contactless cards and readers each of which has mutual signal transmitting and receiving functions, a method for enhancing interoperability of a transmitting payment device with a set of different receiving devices and conversely for enhancing step of interoperability of a receiving device with a set of different transmitting payment devices, the method comprising:
   identifying a range of values (Rtx) of a parameter related to a signal transmitted by a transmitting device and in response to which signal each of the set of different receiving devices are specified to operate properly;
   specifying each of the set of different transmitting devices in proper operation to transmit only a signal which has a parameter value lying within range Rtx;
   identifying a range of values (Rrx) of the parameter related to the signal received by the receiving devices, which range Rrx includes the range Rtx, and
   specifying each of the set of different receiving devices to operate properly in response to any received signal having a parameter value lying within range Rtx, whereupon all transmitting devices operating as specified can generate only signals that have parameter values that correspond to signals for which the receiving devices are specified to operate properly.

10. The method of claim 9, wherein the signals transmitted by the reader devices comprise power and data signals.

11. The method of claim 9, wherein the signals transmitted by the card devices comprise data signals.

12. The method of claim 9, further comprising using a reference device and a reference counterpart device to verify device parameters.

13. The method of claim 12, further comprising specification verification step wherein each transmitting device transmits a signal whose parameter value C is within the specification range Rtx as measured using the reference counterpart device.

14. The method of claim 13, wherein each device is a reader and each counterpart device is a card, and wherein the signal transmitted by the reader is a card-activating power signal, and wherein the specification verification step further comprises measuring a power level of the signal transmitted by the reader on the reference counterpart device.

15. The method of claim 13, wherein each device is a reader and each counterpart device is a card, and wherein the signal transmitted by the reader comprises a data signal, and wherein the specification verification step further comprises measuring a characteristic of the signal transmitted by the reader on the reference counterpart device.

16. The method of claim 13, wherein each device is a card and each counterpart device is a reader, and wherein the signal transmitted by the card comprises a load modulated data signal and wherein a modulation characteristic of the signal transmitted by the card is measured on the reference counterpart device.

17. The method of claim 12, further comprising a specification verification step wherein each counterpart device operates properly when the received signal parameter has any value in the range Rrx by using the reference device to generate and transmit different signals having parameter values across the range Rrx.

18. The method of claim 12, further comprising a calibration step wherein the reference device is calibrated with respect to the characteristics of the reference counterpart device, and conversely the reference counterpart device is calibrated with respect to the characteristics of the reference counterpart device.

* * * * *